(12) United States Patent
Krivenok et al.

(10) Patent No.: US 11,494,210 B2
(45) Date of Patent: Nov. 8, 2022

(54) MAINTAINING MANAGEMENT COMMUNICATIONS ACROSS VIRTUAL STORAGE PROCESSORS

(71) Applicant: EMC IP Holding Company LLC, Hopkinton, MA (US)

(72) Inventors: Dmitry Vladimirovich Krivenok, Saint Petersburg (RU); Christopher R. Dion, Marlborough, MA (US); Michael L. Burriss, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 656 days.

(21) Appl. No.: 16/521,688

(22) Filed: Jul. 25, 2019

(65) Prior Publication Data

US 2021/0026670 A1 Jan. 28, 2021

(51) Int. Cl.
*G06F 9/455* (2018.01)
*G06F 3/06* (2006.01)
*H04L 67/1097* (2022.01)

(52) U.S. Cl.
CPC .......... *G06F 9/45533* (2013.01); *G06F 3/067* (2013.01); *G06F 3/0607* (2013.01); *G06F 3/0634* (2013.01); *G06F 3/0664* (2013.01); *H04L 67/1097* (2013.01)

(58) Field of Classification Search
CPC .. G06F 9/45533; G06F 3/0607; G06F 3/0634; G06F 3/0664; G06F 3/067; H04L 67/1097
See application file for complete search history.

(56) References Cited

U.S. PATENT DOCUMENTS

| | | | |
|---|---|---|---|
| 7,979,517 B1 * | 7/2011 | Wang | G06F 11/2092 709/221 |
| 8,180,855 B2 * | 5/2012 | Aiello | G06F 3/067 709/219 |
| 9,304,999 B1 | 4/2016 | Bono et al. | |
| 9,305,071 B1 | 4/2016 | Bono et al. | |
| 9,424,117 B1 | 8/2016 | Bono et al. | |

(Continued)

OTHER PUBLICATIONS

Hinden, R. et al., "IP Version 6 Addressing Architecture", Standards Track, The Internet Society (2006), RFC 4291, Feb. 2006, 25 pages.

(Continued)

*Primary Examiner* — Emerson C Puente
*Assistant Examiner* — Jonathan R Labud
(74) *Attorney, Agent, or Firm* — BainwoodHuang

(57) ABSTRACT

A unique identifier is stored in shared data storage that is accessible to at least a first virtual storage processor and a second virtual storage processor within a virtual storage appliance. The unique identifier is generated when the virtual storage appliance is first started up, and then used by the first virtual storage processor to obtain at least one Internet Protocol (IP) address for use by a management stack that initially executes in the first virtual storage processor. In response to failure of the first virtual storage processor, the unique identifier is used by the second virtual storage processor to obtain, for use by the management stack while the management stack executes in the second virtual storage processor after the failure, the same IP address obtained by the first virtual storage processor.

15 Claims, 3 Drawing Sheets

---

300
STORE A UNIQUE IDENTIFIER IN A SHARED DATA STORAGE THAT IS ACCESSIBLE TO BOTH A FIRST VIRTUAL STORAGE PROCESSOR AND A SECOND VIRTUAL STORAGE PROCESSOR WITHIN A VIRTUAL STORAGE APPLIANCE

↓

302
THE FIRST VIRTUAL STORAGE PROCESSOR USES THE UNIQUE IDENTIFIER TO OBTAIN AT LEAST ONE INTERNET PROTOCOL (IP) ADDRESS FOR USE BY A MANAGEMENT STACK WHILE THE MANAGEMENT STACK INITIALLY EXECUTES IN THE FIRST VIRTUAL STORAGE PROCESSOR

↓

304
IN RESPONSE TO A FAILURE OF THE FIRST VIRTUAL STORAGE PROCESSOR, THE SECOND VIRTUAL STORAGE PROCESSOR USES THE UNIQUE IDENTIFIER TO OBTAIN, FOR USE BY THE MANAGEMENT STACK WHILE THE MANAGEMENT STACK EXECUTES IN THE SECOND VIRTUAL STORAGE PROCESSOR AFTER THE FAILURE OF THE FIRST VIRTUAL STORAGE PROCESSOR, THE SAME IP ADDRESS OBTAINED BY THE FIRST VIRTUAL STORAGE PROCESSOR

(56) References Cited

U.S. PATENT DOCUMENTS

| | | |
|---|---|---|
| 9,805,105 B1 | 10/2017 | Bono et al. |
| 10,146,574 B1 | 12/2018 | Krivenok et al. |
| 10,204,011 B1 | 2/2019 | Burriss et al. |
| 2008/0049779 A1* | 2/2008 | Hopmann ............... H04L 41/26 370/431 |

OTHER PUBLICATIONS

Narten, T. et al., "Privacy Extensions for Stateless Address Autoconfiguration in IPv6", Standards Track, The Internet Society (2001), RFC 3041, Jan. 2001, 17 pages.
Palet, Jordi., "IPv6 Tutorial" ICANN, Sao Paulo, Dec. 2006, «https://archive.icann.org/en/meetings/saopaulo/presentation-ipv6-tutorial-basics-03dec06.pdf» Article accessed Jul. 29, 2019, 48 pages.

* cited by examiner

MAINTAINING MANAGEMENT COMMUNICATIONS ACROSS VIRTUAL STORAGE PROCESSORS

TECHNICAL FIELD

The disclosed technology relates generally to virtual storage appliances, and more specifically to technology for seamlessly maintaining management communications across multiple virtual storage processors in a virtual storage appliance.

BACKGROUND

Data storage appliances ("storage appliances") are arrangements of hardware and/or software that provide access to non-volatile storage and process I/O (Input/Output) requests (i.e. writes and/or reads) that are received from one or more applications. The I/O requests that are processed by a storage appliance may include block I/O requests as well as file I/O requests. The I/O requests indicate data that is stored in storage objects (e.g. block based and/or file based storage objects) that are maintained by the storage appliance. The storage appliance performs various data storage services that organize and secure data received from the applications.

SUMMARY

In some contexts, it is desirable for a storage appliance to be virtualized, e.g. as a virtual storage appliance (VSA) that executes on one or more hypervisors. It may further be desirable for a VSA to provide high availability to the application(s) that consume its storage services by including multiple (e.g. two or more) virtual storage processors within the VSA, each of which may be embodied as a virtual machine that is capable of processing I/O requests, so that a non-failing one of the virtual storage processors can seamlessly continue processing I/O requests in the event that another one of the storage processors has failed.

A VSA may also include program logic sometimes referred to as a "management stack" that performs management operations on the entire VSA. In some VSAs, some or all of the management stack executes on only one of the virtual storage processors at a time, and is accessed by an administrator user through a management computer that communicates with the management stack over a management network. In the event that the virtual storage processor on which the management stack is currently executing fails, the management stack is migrated to and continues execution on another virtual storage processor within the VSA.

Previous physical hardware storage appliance technologies have used certain techniques for maintaining communications between the management computer and the management stack after failure of a physical storage processor and migration of the management stack to a new physical storage processor. Such previous technologies for maintaining communications between a physical storage appliance and the management computer across a failure of a physical storage processor within the physical storage appliance are often ineffective for VSAs. For example, some previous physical storage appliances have provided the management computer with access to the management stack on an initial physical storage processor and subsequently on a failover physical storage processor by using Media Access Control (MAC) address impersonation technology that enables both the initial physical storage processor and the failover physical storage processor to use a single "virtual" MAC address that is generated within the physical storage appliance. Such technologies may create a virtual device on top of a physical Network Interface Controller (NIC), and then configure the virtual device with the MAC address that is generated within the physical storage appliance. The internally generated MAC address is then used to obtain an Internet Protocol (IP) address that is used by the management stack on the initial and failover storage processors. However, such MAC address impersonation approaches cannot be used in many VSAs, because the typical default security settings of some hypervisors only allow frames to pass through a virtual NIC (vNIC) if the frames use the single MAC address that is assigned to that vNIC by the hypervisor. Accordingly, a virtual switch will not pass incoming frames to the vNIC for the management stack if the frames have a destination MAC address that is generated by the virtual storage appliance and that is different from the MAC address assigned to that vNIC by the hypervisor, and will also not forward outgoing frames that are received from that vNIC if the frames have a source MAC address that is generated by the virtual storage appliance and is different from the MAC address that is assigned to that vNIC by the hypervisor. In order to allow such MAC impersonation based solutions that were used in physical storage appliances to work in a VSA, the security settings of the hypervisor would have to be changed to allow promiscuous mode and forged transmission. Such changes to the hypervisor security settings are generally undesirable, since they may have a negative impact on both system performance and system security.

To address the above described and other shortcomings of previous solutions, technology is disclosed herein for maintaining management communications with a virtual storage appliance after failure of a virtual storage processor on which the management stack initially executes. In the disclosed technology, a unique identifier is stored in shared data storage that is accessible to at least both a first virtual storage processor and a second virtual storage processor within the virtual storage appliance. The unique identifier is used by the first virtual storage processor to obtain at least one Internet Protocol (IP) address for use by a management stack while the management stack initially executes in the first virtual storage processor. In response to a failure of the first virtual storage processor, the unique identifier is used by the second virtual storage processor to obtain, for use by the management stack while the management stack subsequently executes in the second virtual storage processor after the failure of the first virtual storage processor, the same IP address(es) previously obtained by the first virtual storage processor using the unique identifier.

In some embodiments, the first virtual storage processor initially advertises a mapping between the IP address(es) and a first Media Access Control (MAC) address. The first MAC address is a MAC address of a virtual Network Interface Controller (vNIC) that provides network connectivity to the first virtual storage processor. After the failure of the first virtual storage processor, the second virtual storage processor advertises a mapping between the IP address(es) and a second MAC address. The second MAC address is a MAC address of a vNIC that provides network connectivity to the second virtual storage processor.

In some embodiments, the first virtual storage processor and the second virtual storage processor may each be a virtual machine executing in a virtualized execution environment. The unique identifier may be generated by the first virtual storage processor in response to an initial start-up of the virtual storage appliance in the virtualized execution environment. Storing the unique identifier in the shared data storage may be performed in response to generation of the unique identifier at the time of the initial start-up of the virtual storage appliance, and may include or consist of storing the unique identifier to a virtual disk that is accessible to both the first virtual storage processor and the second virtual storage processor.

In some embodiments, the first virtual storage processor may use the unique identifier to obtain the IP address by using the unique identifier to obtain an IP address from a Dynamic Host Configuration Protocol (DHCP) server. In such embodiments, the second virtual storage processor may also use the unique identifier to obtain the same IP address after the failure of the first virtual storage processor by using the unique identifier to obtain the IP address from the DHCP server.

In some embodiments, the DHCP server may include or consist of a DHCP version 4 server, operating to provide Internet Protocol version 4 (IPv4) addresses, and the first virtual storage processor may use the unique identifier to obtain an IP address by using the unique identifier as a client identifier to obtain the IP address (i.e. an IPv4 address) from the DHCP server. In such embodiments, the second virtual storage processor may also use the unique identifier to obtain the same EP address after the failure by using the unique identifier as a client identifier to obtain the IP address from the DHCP server.

In some embodiments, the DHCP server may include or consist of a DHCP version 6 server, operating to provided Internet Protocol version 6 (IPv6) addresses, and the first virtual storage processor may use the unique identifier to obtain an IP address by using the unique identifier as a DHCP unique identifier to obtain the IP address (i.e. an IPv6 address) from the DHCP server. In such embodiments, the second virtual storage processor may also use the unique identifier to obtain the same IP address after the failure of the first virtual storage processor by using the unique identifier as a DHCP unique identifier (DUD) to obtain the LP address from the DHCP server.

In some embodiments, the first virtual storage processor may use the unique identifier to obtain an IP address by using the unique identifier to generate an Extended Unique Identifier (EUI) that is used by the first virtual storage processor to generate an IPv6 address in the first virtual storage processor, using StateLess Address AutoConfiguration ("SLAAC"). In such embodiments, the second virtual storage processor may also use the unique identifier to obtain the same IPv6 address after the failure of the first virtual storage processor by using the unique identifier to generate the same Extended Unique Identifier (EUI) that was previously generated by the first virtual processor, and that is also used by the second virtual storage processor to generate the IPv6 address in the second virtual storage processor, again using StateLess Address AutoConfiguration ("SLAAC").

In some embodiments, execution of the management stack may be started on the second virtual storage processor in response to the failure of the first virtual storage processor.

Embodiments of the disclosed technology may provide significant improvements over previous technologies. For example, embodiments of the disclosed technology allow communications to be seamlessly maintained between a management computer and a management stack of a virtual storage appliance after failure of a first virtual storage processor within the virtual storage appliance, and after migration of execution of the management stack from the first storage processor to a second virtual storage processor within the virtual storage appliance. Embodiments of the disclosed technology advantageously allow the second virtual storage processor to obtain the same IP address(es), whether the IP address is IPv4 or IPv6, for use by the management stack when the management stack executes in the second virtual storage processor, after failure of the first virtual storage processor. The IP address(es) obtained by the second virtual storage processor is/are the same IP address (es) as was/were used by the management stack when the management stack executed in the first virtual storage processor before the failure of the first virtual storage processor. The disclosed technology advantageously does not use the previous MAC address impersonation approaches, in which a single "virtual" MAC address is generated and used by the management stack in both virtual storage processors. Accordingly, embodiments of the disclosed technology avoid making undesirable modifications to the default security settings of the hypervisor or hypervisors on which the virtual storage appliance executes. For example, embodiments of the disclosed technology operate without requiring the hypervisor to allow promiscuous mode and forged transmission, and therefor do not incur the negative impact on both system performance and system security that would result from such security setting modifications that would be necessary to allow MAC address impersonation to be used. In addition, embodiments of the disclosed technology allow the hypervisor to change the MAC addresses of specific vNICs without impacting seamless maintenance of communications between the management computer and the management stack across the failure of a virtual storage processor on which the management stack initially executes.

BRIEF DESCRIPTION OF THE DRAWINGS

The foregoing and other objects, features and advantages will be apparent from the following description of particular embodiments of the disclosed technology, as illustrated in the accompanying drawings in which like reference characters refer to the same parts throughout the different views. The drawings are not necessarily to scale, emphasis instead being placed on illustrating the principles of various embodiments of the disclosed technology.

DETAILED DESCRIPTION

Figure 1:
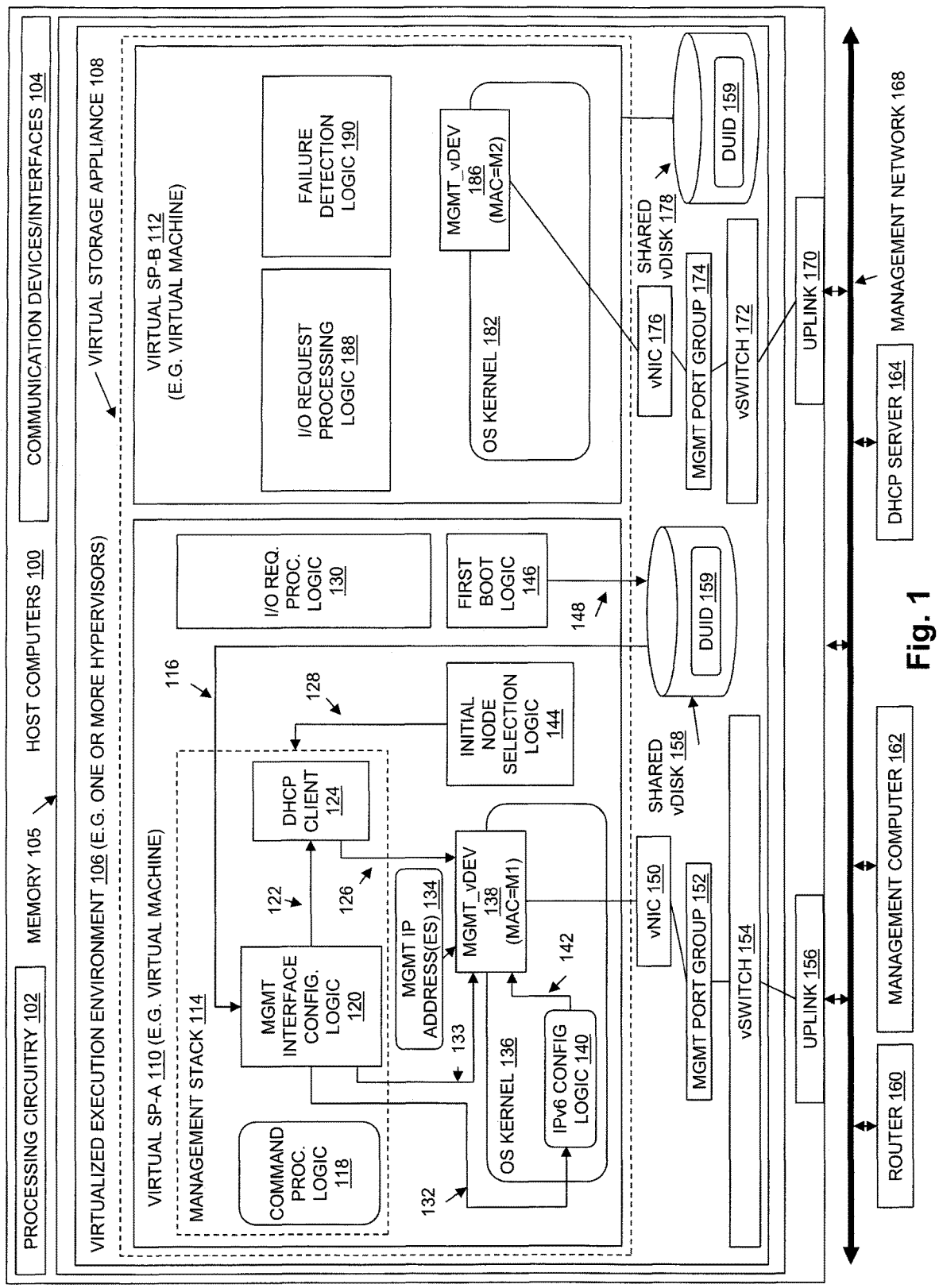
FIG. 1 is a block diagram showing an example of components in some embodiments and an operational environment operating in a first virtual storage processor in a virtual storage appliance in response to an initial boot of the virtual storage appliance.

Embodiments of the invention are described below. The embodiments described herein are only examples of how features and principles of the invention may be embodied, and are given only for purposes of explanation. The invention itself is accordingly broader than the specific examples described below.

The disclosed technology includes and/or operates in a virtual storage appliance having multiple virtual storage processors, and maintains communications between the virtual storage appliance and a management computer after failure of one of the virtual storage processors on which the management stack initially executes. When the virtual storage appliance is initially started up (e.g. booted up for the first time within a virtualized execution environment), a unique identifier is generated by a first virtual storage processor in the virtual storage appliance, and stored by the first virtual storage processor in shared data storage that is accessible to both the first virtual storage processor and a second virtual storage processor within the virtual storage appliance. Such shared data storage may include or consist of i) a shared virtual disk that is replicated such that the first virtual storage processor accesses one copy of the shared virtual disk, and the second virtual storage processor accesses another copy of the shared virtual disk, ii) an externally located key-value store, or iii) some other type of shared data storage that is accessible to both the first virtual storage processor and the second virtual storage processor. The unique identifier may be generated and stored by the first virtual storage processor when the virtual appliance is initially started up, and used by the first virtual storage processor to obtain at least one Internet Protocol (IP) address for a management stack, so that the management stack can communicate with a management computer while the management stack initially executes in the first virtual storage processor. In response to detection of a failure of the first virtual storage processor (e.g. by the second virtual storage processor), the unique identifier is then read from the shared data storage by the second virtual storage processor, and used by the second virtual storage processor to obtain, for use by the management stack to communicate with the management computer while the management stack subsequently executes in the second virtual storage processor after the failure of the first virtual storage processor, the same one or more IP addresses that were initially obtained by the first virtual storage processor when the virtual storage system was initially started.

Further when the virtual storage appliance is first started up, the first virtual storage processor may initially advertise a mapping between the LP address and a first Media Access Control (MAC) address that is a MAC address of a virtual Network Interface Controller (vNIC) that provides network connectivity to the first virtual storage processor. In response to and/or after failure of the first virtual storage processor, the second virtual storage processor may advertise a mapping between the IP address and a second MAC address that is a MAC address of a vNIC that provides network connectivity to the second virtual storage processor.

The unique identifier may be used by the first virtual storage processor and the second virtual storage processor to obtain one or more IPv4 addresses, and/or one or more IPv6 addresses, e.g. from one or more external DHCP servers, or internally using SLAAC.

FIG. 1 shows an example of an environment in which embodiments of the disclosed technology may operate, and an illustrative embodiment of the disclosed technology. FIG. 1 shows an operational environment that includes Host Computers 100, which may be embodied as one or more server computers. For example, the Host Computers 100 may be embodied as a number of networked hardware computing and/or data storage elements located within a cloud infrastructure or the like. The Host Computers 100 include Processing Circuitry 102, Communication Devices/Interfaces 104, and Memory 105. Processing Circuitry 102 may be embodied as one or more hardware processors that are capable of reading and executing program instructions from Memory 105. Communication Devices/Interfaces 104 may be embodied as network interface adapters, SCSI initiators, SCSI targets, etc., that operate at least in part by converting electronic and/or optical signals received over one or more computer and/or communication networks that interconnect Host Computers 100 into electronic form for internal use by Host Computers 100. In some embodiments, the Communication Devices/Interfaces 104 may include or consist of one or more physical communication/networking devices that interconnect the server computers in Host Computers 100, such as physical network switches, routers, etc. As shown in the example of FIG. 1, a Management Network 168 provides communications between Host Computers 100 and i) a Router 160, ii) a Management Computer 162, and iii) a DHCP Server 164 (e.g. one or more DHCPv4 and/or DHCPv6 servers). As further shown in FIG. 1, Communication Devices/Interfaces 104 may include physical network adapters Uplink 156 and Uplink 170 that connect Host Computers 100 to the Management Network 168.

Memory 105 may be embodied as volatile memory (e.g., RAM), and/or non-volatile memory (e.g. ROM, disk drives, solid state drives, etc.). Memory 105 is communicably connected to Processing Circuitry 102, and stores executable program code instructions that are executed on Processing Circuitry 102. As illustrated in FIG. 1, Memory 105 stores specialized software components and/or data structures that may be provided at least in part in the form of executable program instructions. When the executable instructions of the software components shown in FIG. 1 (e.g. Virtualized Execution Environment 106 and Virtual Storage Appliance 108) are executed by Processing Circuitry 102, the methods and functionalities of the software described herein are performed. Although certain specific software constructs are shown in FIG. 1 and described herein, those skilled in the art will recognize that Memory 105 may further include various other types of software constructs that also execute on Processing Circuitry 102, which are not shown.

Virtualized Execution Environment 106 may include or consist of one or more hypervisors. Virtualized Execution Environment 106 provides virtual resources to some number of virtual machines that are also stored in Memory 105, and that execute on Virtualized Execution Environment 106. For example, Virtual storage resources provided by Virtualized Execution Environment 106 may include or consist of some number of virtual disks that each consist of non-volatile data storage allocated from non-volatile data storage devices contained within or communicably coupled to Host Computers 100. In some embodiments, Virtualized Execution Environment 106 may provide virtual disks to multiple virtual storage processors in Virtual Storage Appliance 108. For example, as shown for purposes of illustration in FIG. 1, Virtual Execution Environment 106 may provide a shared virtual disk having a first mirror copy Shared vDisk 158 that is accessible to a first virtual storage processor Virtual SP-A 110, and also having a second mirror copy Shared vDisk 178 that is accessible to a second virtual storage processor Virtual SP-B 112.

While virtual disks are one example of data storage resources that may be provided by the Virtualized Execution Environment 106 to Virtual SP-A 110 and Virtual SP-B 112, the disclosed virtual storage processors may be embodied to consume, and the virtualized execution environment may provide, various other specific types of shared data storage resources, virtual and otherwise, that are additionally or alternatively provided to the virtual storage processors, e.g. by the Virtualized Execution Environment 106 or otherwise. Such other types of data storage resources that may be provided to and/or consumed by the virtual storage processors may include without limitation i) Physical RDMs ("Raw Device Mappings") through which the Virtualized Execution Environment 110 may provide physical disks or logical units ("LUNs") of non-volatile data storage to the virtual storage processors, ii) iSCSI block LUNs provided from an external data storage array or the like that can be consumed by the virtual storage processors as shared data storage, and/or iii) files provided as disk objects, e.g. a filesystem may be created and mounted on the Virtual Storage Appliance 108, and then the virtual storage processors may consume files as disk objects.

The virtual resources provided by Virtualized Execution Environment 106 to the Virtual Storage Appliance 108 may also include some number of virtual networking components, shown for purposes of illustration by a virtual network interface controller vNIC 150, a Management Port Group 152, and a virtual switch vSwitch 154, that are accessible to Virtual SP-A 102, and that connect Virtual SP-A 102 to Management Network 168 through Uplink 156. Virtual networking resources provided by Virtualized Execution Environment 106 may also include a virtual network interface controller vNIC 176, a Management Port Group 174, and a virtual switch vSwitch 172, that are accessible to Virtual SP-B 112, and that connect Virtual SP-B 112 to Management Network 168 through Uplink 170.

The virtual machines that execute on Virtualized Execution Environment 106 include multiple virtual storage processors that operate within the Virtual Storage Appliance 108, including at least the first virtual storage processor Virtual SP-A 110 and the second virtual storage processor Virtual SP-B 112. Each one of the virtual storage processors executing in Virtualized Execution Environment 108 includes I/O request processing logic that processes I/O requests. For example, Virtual SP-A 110 includes I/O Request Processing Logic 130, and Virtual SP-B 112 includes I/O Request Processing Logic 188.

The virtual machines that execute on Virtualized Execution Environment 106 may also include one or more applications that consume data storage services that are provided by the virtual storage processors in Virtual Storage Appliance 108. Such applications may logically connect to and communicate with one or both of Virtual SP-A 110 and/or Virtual SP-B 112 in order to issue block and/or file based I/O requests to Virtual SP-A 110 and/or Virtual SP-B 112. Such I/O requests may include block I/O requests (read requests and/or write requests) that are conveyed to Virtual SP-A 110 and/or Virtual SP-B 112 using block storage interfaces and protocols such as, for example, the Small Computer System Interface (SCSI), Fibre Channel (FC), Serial Attached SCSI (SAS), Internet Small Computer System Interface (iSCSI), and/or other block storage interfaces and/or protocols. Such I/O requests may also or alternatively include file I/O requests (read requests and/or write requests) communicated to Virtual SP-A 110 and/or Virtual SP-B 112 using file storage interfaces and protocols such as, for example, the Network File System (NFS) distributed file system protocol, the Server Message Block (SMB)/Common Internet File System (CIFS) application-layer network protocol, Apple Filing Protocol (AFP), and/or other file storage interfaces and/or protocols. Virtual SP-A 110 and/or Virtual SP-B 112 may accordingly be configured to receive host I/O requests through block-based and/or file-based storage protocols, and to process host I/O requests of either type by reading or writing logical units of non-volatile data storage that are allocated from at least portions of one or more virtual storage resources that are provided to Virtual SP-A 110 and/or Virtual SP-B 112 by Virtualized Execution Environment 106. I/O requests that are directed to and received by Virtual SP-A 110 may be processed by I/O Request Processing Logic 130, and I/O requests that are directed to and received by Virtual SP-B 112 may be processed by I/O Request Processing Logic 188. In some configurations, I/O requests may be distributed across both Virtual SP-A 110 and Virtual SP-B 112 while Virtual SP-A 110 and Virtual SP-B 112 are both functional, e.g. in order to provide load balancing. In the event that one of either Virtual SP-A 110 or Virtual SP-B 112 individually fails, the other virtual storage processor that remains functional continues to process I/O requests without interruption, thereby providing high availability of data storage services from Virtual Storage Appliance 108. Alternatively, I/O requests may be initially processed by Virtual SP-A 110, until Virtual SP-A 110 fails, after which Virtual SP-B 112 seamlessly continues processing I/O requests without interruption of the data storage services provided by Virtual Storage Appliance 108.

Virtual Storage Appliance 108 also includes program logic that receives management commands and performs management operations on the entire Virtual Storage Appliance 108 (e.g. both Virtual SP-A 110 and Virtual SP-B 112), and that is referred to herein as the "management stack". The management stack only executes on one of the virtual storage processors in Virtual Storage Appliance 108 at a time, and may be accessed by an administrator user through one or more management computers, shown for purposes of illustration by Management Computer 162. Management Computer 162 communicates with the management stack of Virtual Storage Appliance 108 over Management Network 168. Communications between Management Computer 162 and the management stack rely on the assignment of one or more IP addresses to the management stack, as shown in FIG. 1 by MGMT IP Address(es) 134. By operation of the disclosed technology, MGMT IP Address(es) 134 are advantageously the same when the management stack initially executes on Virtual SP-A 110 (e.g. as Management Stack 114), and also when the management stack subsequently executes on Virtual SP-B 112 (e.g. as Management Stack 214) after failure of Virtual SP-A 110. In this way the disclosed technology eliminates any need for Management Computer 162 and/or any networking device in Management Network 168 to learn a new IP address for the management stack when the virtual storage processor on which the management stack is executing fails. Whenever Management Computer 162 sends a command to the management stack, either prior to or after failure of Virtual SP-A 110, it can direct the command to the management stack using one of the IP addresses in MGMT IP Address(es) 134 as a destination EP address, regardless of whether the management stack is executing on Virtual SP-A 110 or Virtual SP-B 112.

The specific number and type of IP addresses in MGMT IP Address(es) 134 may be configured by an administrator user, and/or based on network administration policy, etc., and MGMT IP Address(es) 134 may include one or more IPv4 IP addresses, and/or one or more IPv6 IP addresses. The specific manner in which each IP address in MGMT IP Address(es) 134 is obtained may also be configured by an administrator user or policy, e.g. such that MGMT IP Address(es) 134 may include one or more statically allocated IP addresses, one or more IPv6 or IPv4 IP addresses that are dynamically configured through a DHCP server, and/or one or more IPv6 IP addresses that are generated using SLAAC.

When Virtual Storage Appliance 108 is first started up (e.g. booted up) on Virtualized Execution Environment 106, one of the virtual storage processors in Virtual Storage Appliance 108 is selected as the initial virtual storage processor on which the management stack initially executes. For example, based on configuration by an administrator user and/or policy, Initial Node Selection Logic 144 may cause the management stack to initially execute on Virtual SP-A 110 when Virtual Storage Appliance 108 is initially started on Virtualized Execution Environment 106, as shown for purposes of illustration in FIG. 1 by Management Stack 114 executing in Virtual SP-A 110. In some embodiments, Initial Node Selection Logic 144 may be part of logic that is executed on all the virtual storage processors in Virtual Storage Appliance 108 (e.g. as part of a high availability software stack or the like), so that selection of an initial one of the virtual storage processors for execution of the management stack can be coordinated across all the virtual storage processors in Virtual Storage Appliance 108.

While Management Stack 114 executes on Virtual SP-A 110, Command Processing Logic 118 processes management commands that are directed to one of the IP addresses in MGMT IP Address(es) 134, and received by Virtual SP-A 110 from Management Computer 162 over Management Network 168. Such management commands that are processed by Command Processing Logic 118 while Management Stack 114 is executing on Virtual SP-A 110 may, for example, include or consist of management commands that are issued by the administrator user through an administration user interface executing on the Management Computer 162. Various specific types of management commands may be processed by Command Processing Logic 118. Examples of such management commands include without limitation management commands that create and/or configure access to various specific types of data storage objects that are accessible to applications via I/O requests issued by the applications to Virtual SP-A 110 and/or Virtual SP-B 112. For example, management commands processed by Command Processing Logic 118 while Management Stack 114 executes on Virtual SP-A 110 may include commands that create one or more block logical units (LUNs) on Virtual SP-A 110 and/or Virtual SP-B 112, and commands that configure how those block LUNs are accessed on Virtual SP-A 110 and/or Virtual SP-B 112 via the iSCSI protocol. In another example, management commands that are processed by Command Processing Logic 118 while Management Stack 114 executes on Virtual SP-A 110 may include commands that create one or more file system shares on Virtual SP-A 110 and/or Virtual SP-B 112, and commands that configure how those file system shares are accessed on Virtual SP-A 110 and/or Virtual SP-B 112 via the NFS protocol. In another example, such management commands that are processed by Command Processing Logic 118 while Management Stack 114 executes on Virtual SP-A 110 may include one or more commands that initiate a non-disruptive upgrade of software executing in the Virtual Storage Appliance 108 (e.g. software executing in Virtual SP-A 110 and/or Virtual SP-B 108).

Initial generation of MGMT IP Address(es) 134 is performed at the time Virtual Storage Appliance 108 is first started up. For example, First Boot Logic 146 executes in response to Virtual Storage Appliance 108 being started up, and generates a unique identifier DUID 159. First Boot Logic 146 then persistently stores the unique identifier into a shared storage, such as, for example, Shared vDisk 158. In some embodiments and/or configurations, First Boot Logic 146 may generate DUID 159 by generating a DHCP unique identifier having the DUID-LLT format (link-local address+ timestamp), as follows:

i) the first part of DUID 159 is "00:01" which is reserved for the DUID-LLT type, and denoted as P1, ii) the second part of DUID 159 is "00:06" which is reserved for Ethernet, and denoted as P2, iii) the third part of DUID 159 is the number of seconds since midnight Jan. 1, 2000 mod 2^32, represented in hex as AA:BB:CC:DD, and denoted as P3, iv) the fourth part of DUID 159 is the MAC address for vNIC 150 (e.g. the MAC address M1 that is assigned to vNIC 150 by Virtualized Execution Environment 106, which is exposed to Management Stack 114 through the interface MGMT_vDev 138, which is an interface to the Management Network 168 through vNIC 150 that is provided by Operating System Kernel 136), represented in hex as AA:BB:CC:DD:EE:FF, and denoted as P4, and v) the resulting DUID 159 "P1:P2:P3:P4" is represented as a string, and then stored at 148 by First Boot Logic 146 into shared storage, e.g. into Shared vDisk 158.

In some embodiments, an exact "mirror" copy of the contents of Shared vDisk 158 may be maintained in Shared vDisk 178, so that storing DUID 159 to Shared vDisk 158 also causes DUID 159 to be simultaneously stored in Shared vDisk 178. Since Shared vDisk 178 is accessible to Virtual SP-B 112, the fact that DUID 159 is stored in both Shared vDisk 158 and Shared vDisk 178 results in DUID 159 being persistently stored with respect to any failure of Virtual SP-A 110, since DUID 159 will remain accessible to Virtual SP-B 112 on Shared vDisk 178 even after a failure of Virtual SP-A 110.

While the example of FIG. 1 shows DUID 159 being persistently stored at 148 into shared storage that includes or consists of a shared virtual disk, copies of which are accessible to both Virtual SP-A 110 and Virtual SP-B 108, the disclosed technology is not limited to embodiments that use a shared virtual disk as the shared storage for persistently storing DUID 159. Those skilled in the art will recognize that the disclosed technology may be embodied using various other specific types of shared storage to persistently store DUID 159, so that DUID 159 remains accessible to Virtual SP-B 112 after the failure of Virtual SP-A 110. Examples of other types of shared storage that may be used in this regard include, for example, a key-value store that is located externally with regard to Virtual Storage Appliance 108, and that is accessible to both Virtual SP-A 110 and Virtual SP-B 112.

After Initial Node Selection Logic 144 has started Management Stack 114 on Virtual SP-A 110, and after DUID 159 has been persistently stored by First Boot Logic 146, at 116 Management Interface Configuration Logic 120 may read the persistently stored DUID 159, e.g. from Shared vDisk 158. Management Interface Configuration Logic 120 then uses DUID 159 to obtain at least one Internet Protocol (IP) address for assignment to and/or use by Management Stack 114 when communicating with Management Computer 162 while Management Stack 114 initially executes in Virtual SP-A 110 when Virtual Storage Appliance 108 is first started up, as shown for purposes of illustration by MGMT IP Address(es) 134.

For example, Management Interface Configuration Logic 120 may use DUID 159 to obtain one or more IP addresses in MGMT IP Address(es) 134 by using DUID 159 to obtain one or more IP addresses from a DHCP server, e.g. DHCP Server 164. In the case where one or more of the IP addresses in MGMT IP Address(es) 134 are dynamically configured IPv4 IP addresses, Management Interface Configuration Logic 120 may configure the DHCP Client 124 within Management Stack 114 such that DHCP Client 124 performs dynamic IP address configuration through a remote DHCPv4 server (e.g. DHCP Server 164), using DUID 159 as a client identifier, in order to obtain one or more IPv4 IP addresses in MGMT IP Address(es) 134. In such a case, DHCP Client 124 may use DUID 159 as a client identifier in some number of DHCP Protocol Data Units (PDUs), such as DHCPDISCOVER and/or DHCPREQUEST PDUs, that are caused to be communicated at 126 from Virtual SP-A 110 over Management Network 168 to DHCP Server 164, in order to obtain from DHCP Server 164 one or more dynamically configured IPv4 IP addresses in MGMT IP Address(es) 134.

In another example, in the case where one or more IP addresses in MGMT IP Address(es) 134 are dynamically configured IPv6 IP addresses, Management. Interface Configuration Logic 120 may configure the DHCP Client 124 within Management Stack 114 such that DHCP Client 124 performs dynamic IP address configuration through a DHCPv6 server (e.g. DHCP Server 164), using DUID 159 as a DHCP unique identifier (DUID), in order to obtain one or more IPv6 IP addresses. In such a case, DHCP Client 124 uses DUID 159 as a DUID in some number of DHCP Protocol Data Units (PDUs), such as DHCPDISCOVER and/or DHCPREQUEST PDUs, that are caused to be communicated at 126 from Virtual SP-A 110 over Management Network 168 to DHCP Server 164, in order to obtain from DHCP Server 164 one or more of the dynamically configured IPv6 IP addresses in MGMT IP Address(es) 134.

In another example, in another case where one or more of MGMT IP Address(es) 134 are IPv6 IP addresses, and where those IPv6 IP addresses are generated using SLAAC, Management Interface Configuration Logic 120 may use DUID 159 to generate an Extended Unique Identifier (EUI) that is passed at 132 to IPv6 Configuration Logic 140 within Operating System Kernel 136 for use in generating one or more IPv6 IP addresses using SLAAC. In some embodiments, Management Interface Configuration Logic 120 may use DUID 159 to generate an EUI that is a modified EUI-64 value, as follows:

i) Calculate a hash of DUID 159 (e.g. using a cryptographic hash function such as MD5 or SHA-1), denoted as H, ii) Read a 24-bit IEEE Organizationally Unique Identifier (OUI) that is reserved for the storage vendor associated with Virtual Storage Appliance 108 (e.g. by reading an OUI constant from Memory 105), denoted as O, and iii) Concatenate O and the first 40 bits of H and then invert a universal/local bit at a predetermined bit location within the result.

The resulting EUI value is then passed at 132 to IPv6 Configuration Logic 140. IPv6 Configuration Logic 140 uses the EUI together with Internet Layer configuration parameters that are received by Virtual SP-A 110 in a router advertisement (e.g. from Router 160) to generate an IPv6 IP address using SLAAC, and then passes the resulting IPv6 address to MGMT_vDEV 132 for inclusion in MGMT IP Address(es) 134.

In another example, in the case where one or more of MGMT IP Address(es) 134 are statically allocated IP addresses, Management Interface Configuration Logic 120 may also operate to set those statically allocated EP addresses in MGMT LP Address(es) 134 at the time when MGMT IP Address(es) 134 are generated.

In some embodiments, after generation of MGMT IP Addresses 134, Virtual SP-A 110 may initially advertise one or more mappings between the IP addresses in MGMT IP Addresses 134 and a MAC address of vNIC 150, indicating that Management Stack 114 can be reached through vNIC 150. In the example of FIG. 1, M1 may be the MAC address assigned to vNIC 150 by a hypervisor, e.g. by Virtualized Execution Environment 106, and vNIC 150 may provide network connectivity to Virtual SP-A 110, e.g. through Management Port Group 152, vSwitch 154, and Uplink 156. For example, advertisements of the mapping between the IP addresses in MGMT IP Addresses 134 and M1 may generated at 133 when Management Interface Configuration Logic 120 uses MGMT_vDev 138 to cause one or more Gratuitous Address Resolution Protocol (GARP) messages to be transmitted, e.g. by Virtual SP-A 110 over Management Network 168. Such GARP packets caused to be transmitted at 133 advertise mappings between one or more of the IP addresses in MGMT IP Address(es) 134 and the MAC address of vNIC 150, e.g. M1. In another example, at 133 Management Interface Configuration Logic 120 may use MGMT_vDev 138 to cause one or more Unsolicited Neighbor Advertisement (UNA) messages to be transmitted, e.g. by Virtual SP-A 110 over Management Network 168. Such UNA packets caused to be transmitted at 133 may also or alternatively advertise mappings between one or more of the IP addresses in MGMT IP Address(es) 134 and the MAC address of vNIC 150, e.g. M1.

While the management stack executes as Management Stack 114 on Virtual SP-A 110, an Operating System Kernel 182 in Virtual SP-B 112 also has an interface MGMT_vDev 186, albeit to vNIC 176. Accordingly, MGMT_vDev 186 exposes access to Management Network 168 through vNIC 176, and also exposes the MAC address assigned to vNIC 176 by the hypervisor, e.g. the MAC address M2 assigned to vNIC 176 by Virtualized Execution Environment 106. However, the state of MGMT_vDev 186 is "DOWN" while Management Stack 114 executes on Virtual SP-A 110, and MGMT_vDev 186 is not used to access Management Network 168, since there is no management stack executing on Virtual SP-B 112.

Also while the management stack executes as Management Stack 114 on Virtual SP-A 110, Failure Detection Logic 190 operates in Virtual SP-B 112 to detect when Virtual SP-A 110 fails. For example, Failure Detection Logic 190 may operate by monitoring periodic heartbeat messages that are transmitted from Virtual SP-A 110 and received by Virtual SP-B 112. In response to detecting that no heartbeat message has been received from Virtual SP-A 110 for longer than some predetermined period of time, Failure Detection Logic 190 may detect that Virtual SP-A 110 has failed. The disclosed technology is not limited to detection of the failure of Virtual SP-A 110 based on monitoring of heartbeat messages, and other types of failure detection may be used in addition or in the alternative. In response to detecting that Virtual SP-A 110 has failed, Failure Detection Logic 190 causes the management stack to be executed on Virtual SP-B 112. Further operation of the disclosed technology following the failure of Virtual SP-A 110 is described below with reference to FIG. 2. In some embodiments, Failure Detection Logic 190 may be part of logic that is executed on all the virtual storage processors in Virtual Storage Appliance 108 (e.g. as part of a high availability software stack or the like), so that failure detection and/or selection of one of the virtual storage processors in Virtual Storage Appliance 108 for execution of the management stack after failure of Virtual SP-A 110 can be coordinated across all of the currently functioning virtual storage processors in Virtual Storage Appliance 108.

Figure 2:
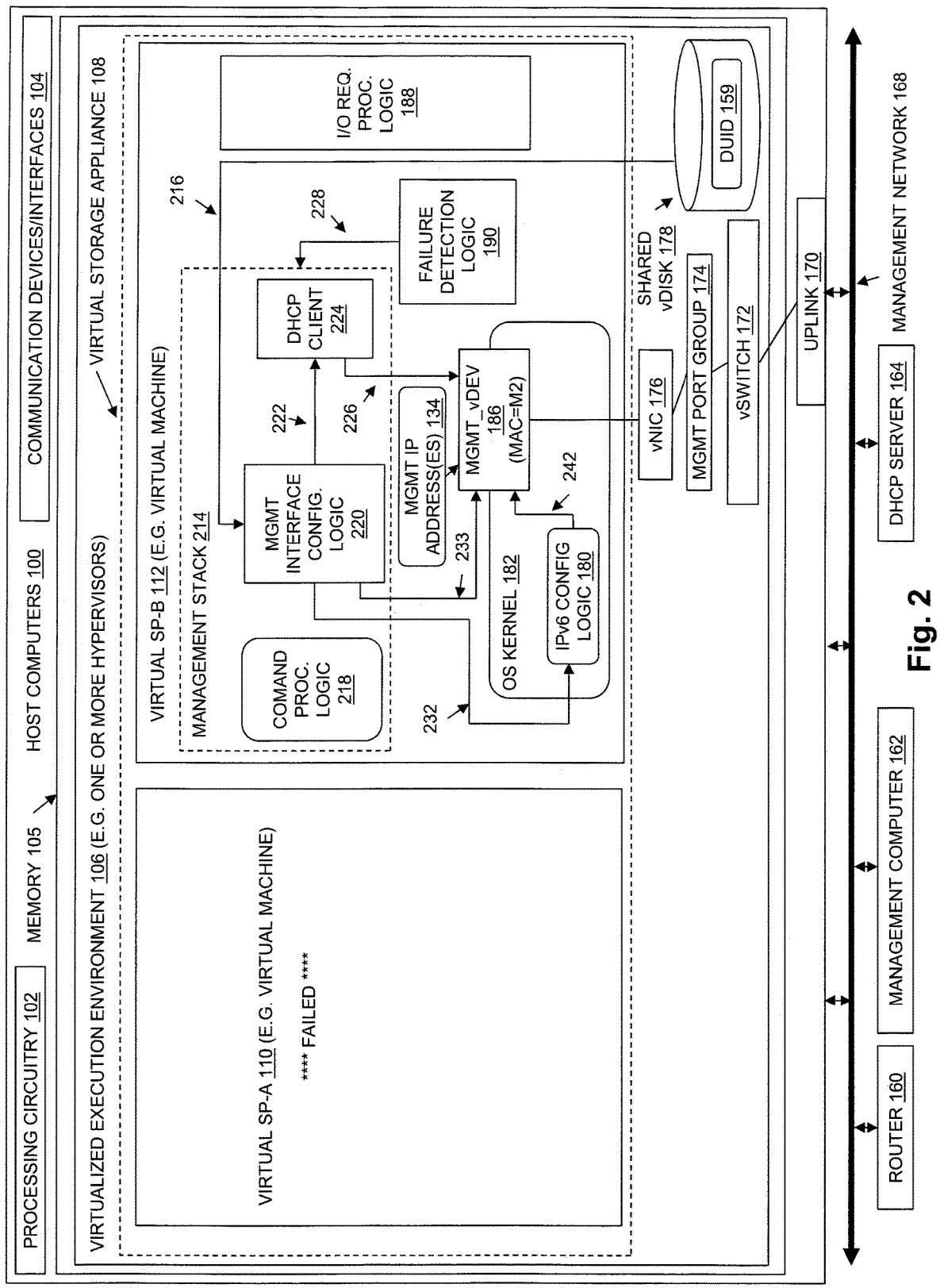
FIG. 2 is a block diagram showing an example of components in some embodiments and an operational environment operating in a second virtual storage processor in response to detection of a failure of the first virtual storage processor in the virtual storage appliance shown in FIG. 1.

FIG. 2 is a block diagram showing an example of components in some embodiments and an operational environment operating in Virtual SP-B 112 in response to Failure Detection Logic 190 detecting that Virtual SP-A 110 has failed. When Failure Detection Logic 190 detects that Virtual SP-A 110 has failed, one of the other virtual storage processors in Virtual Storage Appliance 108 is selected to be virtual storage processor on which the management stack subsequently executes. For example, selection of the virtual storage processor on which the management stack executes after failure of Virtual SP-A 110 may be based on configuration by an administrator user and/or based on a policy, and/or an election algorithm or the like performed by the remaining functional virtual storage processors in Virtual Storage Appliance 108. In the example of FIG. 2, Virtual SP-B 112 is selected as the virtual storage processor on which the management stack executes after the failure of Virtual SP-A 110. Accordingly, at 228 the Failure Detection Logic 190 may cause the management stack to begin executing on Virtual SP-B 112 when Virtual SP-A 110 fails, as shown for purposes of illustration in FIG. 2 by Management Stack 214 executing on Virtual SP-B 112. When Management Stack 214 begins execution on Virtual SP-B 112, the state of MGMT_vDev 186 is changed from "DOWN" to "UP", thus allowing Management Stack 214 to access Management Network 168 through vNIC 176 using MGMT_vDev 186. For example, the state of MGMT_vDev 186 is changed from "DOWN" to "UP" only after IPv6 Configuration Logic 180 within Operating System Kernel 182 has been configured with the Extended Unique Identifier (EUI) generated using DUID 159, and after the configuration of DHCP client 224 has been updated with DUID 159.

While Management Stack 214 executes on Virtual SP-B 112, Command Processing Logic 218 processes management commands that are directed to one of the IP addresses in MGMT IP Address(es) 134, and are received by Virtual SP-B 112 from Management Computer 162 over Management Network 168. Such management commands that are processed by Command Processing Logic 218 while Management Stack 214 is executing on Virtual SP-B 112 may, for example, include or consist of the same types of management commands that were issued by the administrator user through the administration user interface executing on the Management Computer 162 and processed by Command Processing Logic 118 while the management stack executed on Virtual SP-A 110, such as management commands that create and/or configure access to various specific types of data storage objects that are accessible to applications via I/O requests issued by the applications to Virtual SP-B 112 and/or to any other virtual storage processors in Virtual Storage Appliance 108 that remain functional after the failure of Virtual SP-A 110. Accordingly, management commands processed by Command Processing Logic 218 while Management Stack 214 executes on Virtual SP-B 112 may include, for example, commands that create one or more block logical units (LUNs) on Virtual SP-B 112, and commands that configure how those block LUNs are accessed on Virtual SP-B 112 via the iSCSI protocol. Similarly, management commands that are processed by Command Processing Logic 218 while Management Stack 214 executes on Virtual SP-B 112 may include commands that create one or more file system shares on Virtual SP-B 112, and commands that configure how those file system shares are accessed on Virtual SP-B 112 via the NFS protocol.

As shown in FIG. 2, in response to detecting and/or after the failure of Virtual SP-A 110, and after Failure Detection Logic 190 causes Management Stack 214 to begin execution in Virtual SP-B 112, Management Interface Configuration Logic 220 reads the persistently stored DUID 159 at 216 from whatever shared storage the DUID 216 was previously stored into by Virtual SP-A 110, e.g. from Shared vDisk 178. Management Interface Configuration Logic 220 then uses DUID 159 to obtain the MGMT IP Address(es) 134 for assignment to and/or use by Management Stack 214 when communicating with Management Computer 162 while Management Stack 214 executes in Virtual SP-B 112 after failure of Virtual SP-A 110. Advantageously, and as described below, the persistently stored DUD 159 enables Virtual SP-B 112 to obtain the same IP addresses, i.e. MGMT IP Address(es) 134, that were initially obtained by Virtual SP-A 110 when Virtual Storage Appliance 108 was first started up.

For example, Management Interface Configuration Logic 220 may use DUID 159 to obtain one or more of the IP addresses in MGMT IP Address(es) 134 by using DUID 159 to obtain those IP addresses from a DHCP server, e.g. DHCP Server 164. In the case where one or more of the IP addresses in MGMT IP Address(es) 134 are dynamically configured IPv4 IP addresses, Management Interface Configuration Logic 220 may configure the DHCP Client 224 within Management Stack 214 such that DHCP Client 224 performs dynamic IP address configuration through a remote DHCPv4 server (e.g. DHCP Server 164), using DUID 159 as a client identifier, in order to obtain one or more dynamically configured IPv4 IP addresses in MGMT IP Address(es) 134. In such a case, DHCP Client 224 may use DUD 159 as a client identifier in some number of DHCP Protocol Data Units (PDUs), such as DHCPDISCOVER and/or DHCPREQUEST PDUs, that are caused to be communicated at 226 from Virtual SP-B 112 over Management Network 168 to DHCP Server 164, in order to obtain from DHCP Server 164 the one or more dynamically configured IPv4 LP addresses in MGMT IP Address(es) 134.

In another example, in the case where one or more IP addresses in MGMT IP Address(es) 134 are dynamically configured IPv6 IP addresses, Management Interface Configuration Logic 220 may configure the DHCP Client 224 within Management Stack 214 such that DHCP Client 224 performs dynamic IP address configuration through a DHCPv6 server (e.g. DHCP Server 164), using DUID 159 as a DHCP unique identifier (DUID), in order to obtain those IPv6 IP addresses. In such a case, DHCP Client 224 uses DUID 159 as a DUID in some number of DHCP Protocol Data Units (PDUs), such as DHCPDISCOVER and/or DHCPREQUEST PDUs, that are caused to be communicated at 226 from Virtual SP-B 112 over Management Network 168 to DHCP Server 164, in order to obtain from DHCP Server 164 those one or more of the dynamically configured IPv6 IP addresses in MGMT IP Address(es) 134.

In another example, in another case where one or more of MGMT IP Address(es) 134 are IPv6 IP addresses, and where those IPv6 IP addresses are generated using SLAAC, Management Interface Configuration Logic 220 may use DUID 159 to generate an Extended Unique Identifier (EUI) that is passed at 232 to IPv6 Configuration Logic 180 within Operating System Kernel 182 for use in generating one or more IPv6 LP addresses using SLAAC. Management Interface Configuration Logic 220 uses DUID 159 to generate the EUI in the same way that Management Interface Configuration Logic 120 used DUID 159 to generate the EUI in Virtual SP-A 110, as described above with reference to FIG. 1. Specifically, in some embodiments, Management Interface Configuration Logic 220 may use DUID 159 to generate an EUI that is a modified EUI-64 value, as follows:

i) Calculate a hash of DUID 159 (e.g. using a cryptographic hash function such as MD5 or SHA-1), denoted as H, ii) Read a 24-bit IEEE Organizationally Unique Identifier (OUI) that is reserved for the storage vendor associated with Virtual Storage Appliance 108 (e.g. by reading an OUI constant from Memory 105), denoted as O, and iii) Concatenate O and the first 40 bits of H and then invert a universal/local bit at a predetermined bit location within the result.

The resulting EUI value is then passed at 232 to IPv6 Configuration Logic 180. IPv6 Configuration Logic 180 uses the EUI together with Internet Layer configuration parameters that are received by Virtual SP-B 112 in a router advertisement (e.g. again from Router 160) to generate the IPv6 IP address using SLAAC, and then passes the resulting IPv6 address to MGMT_vDEV 134 for inclusion in MGMT IP Address(es) 134.

In another example, in the case where one or more of MGMT IP Address(es) 134 are statically allocated IP addresses, Management Interface Configuration Logic 220 may also operate to set those statically allocated IP addresses in MGMT IP Address(es) 134.

In some embodiments, in response to and/or after failure of Virtual SP-A 110, Virtual SP-B 112 may initially advertise one or more mappings between the IP addresses in MGMT LP Addresses 134 and a MAC address of vNIC 176, indicating that Management Stack 214 can be reached through vNIC 176. In the example of FIG. 2, M2 may be the MAC address assigned to vNIC 176 by a hypervisor, e.g. by Virtualized Execution Environment 106, and vNIC 176 may provide network connectivity to Virtual SP-B 112, e.g. through Management Port Group 174, vSwitch 172, and Uplink 170. For example, advertisements of the mapping between the IP addresses in MGMT IP Addresses 134 and M2 may generated at 233 when Management Interface Configuration Logic 220 uses MGMT_vDev 186 to cause one or more Gratuitous Address Resolution Protocol (GARP) messages to be transmitted, e.g. by Virtual SP-B 112 over Management Network 168. Such GARP packets caused to be transmitted at 233 advertise mappings between one or more of the IP addresses in MGMT IP Address(es) 134 and the MAC address of vNIC 176, e.g. M2. In another example, at 233 Management Interface Configuration Logic 220 may use MGMT_vDev 186 to cause one or more Unsolicited Neighbor Advertisement (UNA) messages to be transmitted, e.g. by Virtual SP-B 112 over Management Network 168. Such UNA packets caused to be transmitted at 233 may also or alternatively advertise mappings between one or more of the IP addresses in MGMT IP Address(es) 134 and the MAC address of vNIC 176, e.g. M2.

Figure 3:
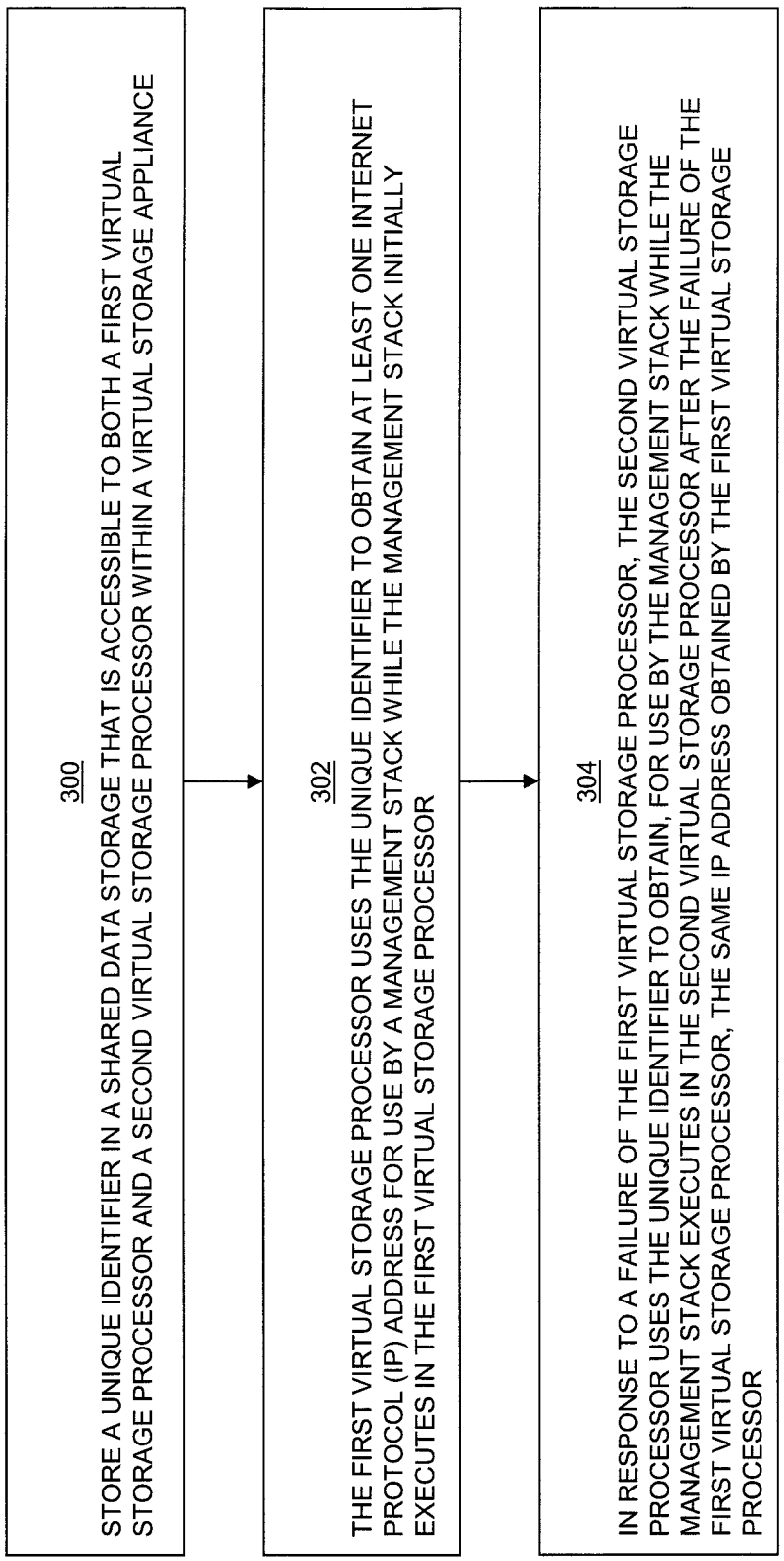
FIG. 3 is a flow chart showing an example of steps performed in some embodiments in response to an initial boot of a virtual storage appliance.

FIG. 3 is a flow chart showing an example of steps that may be performed in some embodiments.

At step 300, a unique identifier is stored in a shared data storage that is accessible to both a first virtual storage processor and a second virtual storage processor within a virtual storage appliance.

At step 302, the first virtual storage processor uses the unique identifier to obtain at least one Internet Protocol (IP) address for use by a management stack while the management stack initially executes in the first virtual storage processor.

At step 304, in response to a failure of the first virtual storage processor, the second virtual storage processor uses the unique identifier to obtain, for use by the management stack while the management stack executes in the second virtual storage processor after the failure of the first virtual storage processor, the same IP address obtained by the first virtual storage processor.

As will be appreciated by those skilled in the art, the technologies disclosed herein may be embodied as a system, method or computer program product. Accordingly, each specific feature of the present disclosure may be embodied using hardware, software (including firmware, resident software, micro-code, etc.) or a combination of software and hardware. Furthermore, the technologies disclosed herein may take the form of a computer program product embodied in one or more non-transitory computer readable storage medium(s) having computer readable program code stored thereon for causing a processor and/or computer system to perform the techniques of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art will readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media.

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
   storing a unique identifier in shared data storage that is accessible to both a first virtual storage processor and a second virtual storage processor within a virtual storage appliance;
   using the unique identifier by the first virtual storage processor to obtain at least one Internet Protocol (IP) address for use by a management stack while the management stack initially executes in the first virtual storage processor;
   in response to a failure of the first virtual storage processor, using the unique identifier by the second virtual storage processor to obtain, for use by the management stack while the management stack executes in the second virtual storage processor after the failure, the same IP address obtained by the first virtual storage processor;
   initially advertising, by the first virtual storage processor, a mapping between the IP address and a first Media Access Control (MAC) address, wherein the first MAC address is a MAC address of a virtual Network Interface Controller (vNIC) providing network connectivity to the first virtual storage processor; and
   after the failure of the first virtual storage processor, advertising, by the second virtual storage processor, a mapping between the IP address and a second MAC address, wherein the second MAC address is a MAC address of a vNIC providing network connectivity to the second virtual storage processor.

2. The method of claim 1, wherein the first virtual storage processor and the second virtual storage processor each comprise a virtual machine executing in a virtualized execution environment, and further comprising:
   generating the unique identifier by the first virtual storage processor in response to an initial start-up of the virtual storage appliance in the virtualized execution environment; and
   wherein storing the unique identifier in the shared data storage is performed in response to generation of the unique identifier at the time of the initial start-up of the virtual storage appliance, and comprises storing the unique identifier to a virtual disk that is accessible to both the first virtual storage processor and the second virtual storage processor.

3. The method of claim 2, wherein using the unique identifier by the first virtual storage processor to obtain the IP address comprises the first virtual storage processor using the unique identifier to obtain the IP address from a Dynamic Host Configuration Protocol (DHCP) server; and
   wherein using the unique identifier by the second virtual storage processor to obtain the IP address after the failure of the first virtual storage processor comprises the second virtual storage processor using the unique identifier to obtain the IP address from the DHCP server.

4. The method of claim 3, further comprising:
   wherein the DHCP server comprises a DHCP version 4 server;
   wherein using the unique identifier by the first virtual storage processor to obtain the IP address comprises using the unique identifier as a client identifier to obtain the IP address from the DHCP server; and
   wherein using the unique identifier by the second virtual storage processor to obtain the IP address comprises using the unique identifier as a client identifier to obtain the IP address from the DHCP server.

5. The method of claim 3, further comprising:
   wherein the DHCP server comprises a DHCP version 6 server;
   wherein using the unique identifier by the first virtual storage processor to obtain the IP address comprises using the unique identifier as a DHCP unique identifier to obtain the IP address from the DHCP server; and
   wherein using the unique identifier by the second virtual storage processor to obtain the IP address comprises using the unique identifier as a DHCP unique identifier to obtain the IP address from the DHCP server.

6. The method of claim 2, wherein using the unique identifier by the first virtual storage processor to obtain the IP address comprises the first virtual storage processor using the unique identifier to generate an extended unique identifier that is used to generate an IPv6 IP address in the first virtual storage processor using StateLess Address AutoConfiguration (SLAAC); and
   wherein using the unique identifier by the second virtual storage processor to obtain the IP address after the failure of the first virtual storage processor comprises the second virtual storage processor using the unique identifier to generate the extended unique identifier that is used to generate the IPv6 IP address in the second virtual storage processor using SLAAC.

7. The method of claim 2, further comprising:
   starting up the management stack on the second virtual storage processor in response to the failure of the first virtual storage processor.

8. A system, comprising:
   processing circuitry and memory coupled to the processing circuitry, the memory storing instructions, wherein the instructions, when executed by the processing circuitry, cause the processing circuitry to:
   store a unique identifier in shared data storage that is accessible to both a first virtual storage processor and a second virtual storage processor within a virtual storage appliance,
   use the unique identifier by the first virtual storage processor to obtain at least one Internet Protocol (IP) address for use by a management stack while the management stack initially executes in the first virtual storage processor,
   in response to a failure of the first virtual storage processor, use the unique identifier by the second virtual storage processor to obtain, for use by the management stack while the management stack executes in the second virtual storage processor after the failure, the same IP address obtained by the first virtual storage processor,
   initially advertise, by the first virtual storage processor, a mapping between the IP address and a first Media Access Control (MAC) address, wherein the first MAC address is a MAC address of a virtual Network Interface Controller (vNIC) providing network connectivity to the first virtual storage processor; and
   after the failure of the first virtual storage processor, advertise, by the second virtual storage processor, a mapping between the IP address and a second MAC address, wherein the second MAC address is a MAC address of a vNIC providing network connectivity to the second virtual storage processor.

9. The system of claim 8, wherein the first virtual storage processor and the second virtual storage processor each comprise a virtual machine executing in a virtualized execution environment, and wherein the instructions, when executed by the processing circuitry, further cause the processing circuitry to:
generate the unique identifier by the first virtual storage processor in response to an initial start-up of the virtual storage appliance in the virtualized execution environment; and
store the unique identifier in the shared data storage in response to generation of the unique identifier at the time of the initial start-up of the virtual storage appliance, at least in part by storing the unique identifier to a virtual disk that is accessible to both the first virtual storage processor and the second virtual storage processor.

10. The system of claim 9, wherein the instructions, when executed by the processing circuitry, further cause the processing circuitry to:
use the unique identifier to obtain, by the first virtual storage processor, the IP address, at least in part by the first virtual storage processor using the unique identifier to obtain the IP address from a Dynamic Host Configuration Protocol (DHCP) server; and
use the unique identifier to obtain, by the second virtual storage processor, the IP address, after the failure of the first virtual storage processor, at least in part by the second virtual storage processor using the unique identifier to obtain the IP address from the DHCP server.

11. The system of claim 10, wherein the DHCP server comprises a DHCP version 4 server, and wherein the instructions, when executed by the processing circuitry, further cause the processing circuitry to:
use the unique identifier to obtain, by the first virtual storage processor, the IP address, at least in part by the first virtual storage processor using the unique identifier as a client identifier to obtain the IP address from the DHCP server; and
use the unique identifier to obtain, by the second virtual storage processor, the IP address, at least in part by the second virtual storage processor using the unique identifier as a client identifier to obtain the IP address from the DHCP server.

12. The system of claim 10, wherein the DHCP server comprises a DHCP version 6 server, and wherein the instructions, when executed by the processing circuitry, further cause the processing circuitry to:
use the unique identifier to obtain, by the first virtual storage processor, the IP address, at least in part by the first virtual storage processor using the unique identifier as a DHCP unique identifier to obtain the IP address from the DHCP server; and
use the unique identifier to obtain, by the second virtual storage processor, the IP address, at least in part by the second virtual storage processor using the unique identifier as a DHCP unique identifier to obtain the IP address from the DHCP server.

13. The system of claim 9, wherein the instructions, when executed by the processing circuitry, further cause the processing circuitry to:
use the unique identifier to obtain, by the first virtual storage processor, the IP address, at least in part by the first virtual storage processor using the unique identifier to generate an extended unique identifier that is used to generate an IPv6 IP address in the first virtual storage processor using StateLess Address AutoConfiguration (SLAAC); and
use the unique identifier to obtain, by the second virtual storage processor, the IP address after the failure of the first virtual storage processor, at least in part by the second virtual storage processor using the unique identifier to generate the extended unique identifier that is used to generate the IPv6 IP address in the second virtual storage processor using SLAAC.

14. The system of claim 9, wherein the instructions, when executed by the program code, further cause the program code to:
start up the management stack on the second virtual storage processor in response to the failure of the first virtual storage processor.

15. A computer program product, comprising:
a non-transitory, computer-readable medium having instructions stored thereon that, when executed by processing circuitry, cause the processing circuitry to perform a method comprising the steps of:
storing a unique identifier in shared data storage that is accessible to both a first virtual storage processor and a second virtual storage processor within a virtual storage appliance;
using the unique identifier by the first virtual storage processor to obtain at least one Internet Protocol (IP) address for use by a management stack while the management stack initially executes in the first virtual storage processor;
in response to a failure of the first virtual storage processor, using the unique identifier by the second virtual storage processor to obtain, for use by the management stack while the management stack executes in the second virtual storage processor after the failure, the same IP address obtained by the first virtual storage processor;
initially advertising, by the first virtual storage processor, a mapping between the IP address and a first Media Access Control (MAC) address, wherein the first MAC address is a MAC address of a virtual Network Interface Controller (vNIC) providing network connectivity to the first virtual storage processor; and
after the failure of the first virtual storage processor, advertising, by the second virtual storage processor, a mapping between the IP address and a second MAC address, wherein the second MAC address is a MAC address of a vNIC providing network connectivity to the second virtual storage processor.

\* \* \* \* \*